United States Patent

Besenmatter et al.

[11] 4,087,160
[45] May 2, 1978

[54] CAMERA OBJECTIVE OF VARIABLE FOCAL LENGTH

[75] Inventors: Walter Besenmatter; Trude Muszumanski, both of Vienna; Irmgard Wendisch, Trumau, all of Austria

[73] Assignees: Karl Vockenhuber; Raimund Hauser, both of Vienna, Austria

[21] Appl. No.: 747,207

[22] Filed: Dec. 3, 1976

[30] Foreign Application Priority Data

Dec. 5, 1975 Austria .................................. 9297/75

[51] Int. Cl.² ................................................ G02B 15/18
[52] U.S. Cl. .................................. 350/184; 350/207
[58] Field of Search ............................... 350/184, 207

[56] References Cited

U.S. PATENT DOCUMENTS 3,433,559  3/1969  Vockenhuber et al. ............. 350/184
3,918,797  11/1975  Takano ............................. 350/207
3,918,798  11/1975  Takano ............................. 350/207

Primary Examiner—Conrad J. Clark
Attorney, Agent, or Firm—Montague & Ross

[57] ABSTRACT

A varifocal forward lens group of a camera objective, with a pair of axially shiftable negative components bracketed by a pair of substantially fixed positive components, has its negative third component more widely separated from its positive fourth component in a wide-angle position of minimum overall focal length than in a telephoto position of maximum overall focal length. The effective diameter of that third component is just large enough to let a bundle of axially incident light rays fully illuminate the fourth component in the wide-angle position, with less than full illumination in the telephoto position. The positive first component is also just large enough to provide full illumination of the effective area of the third component by axial rays in the telephoto position.

8 Claims, 9 Drawing Figures

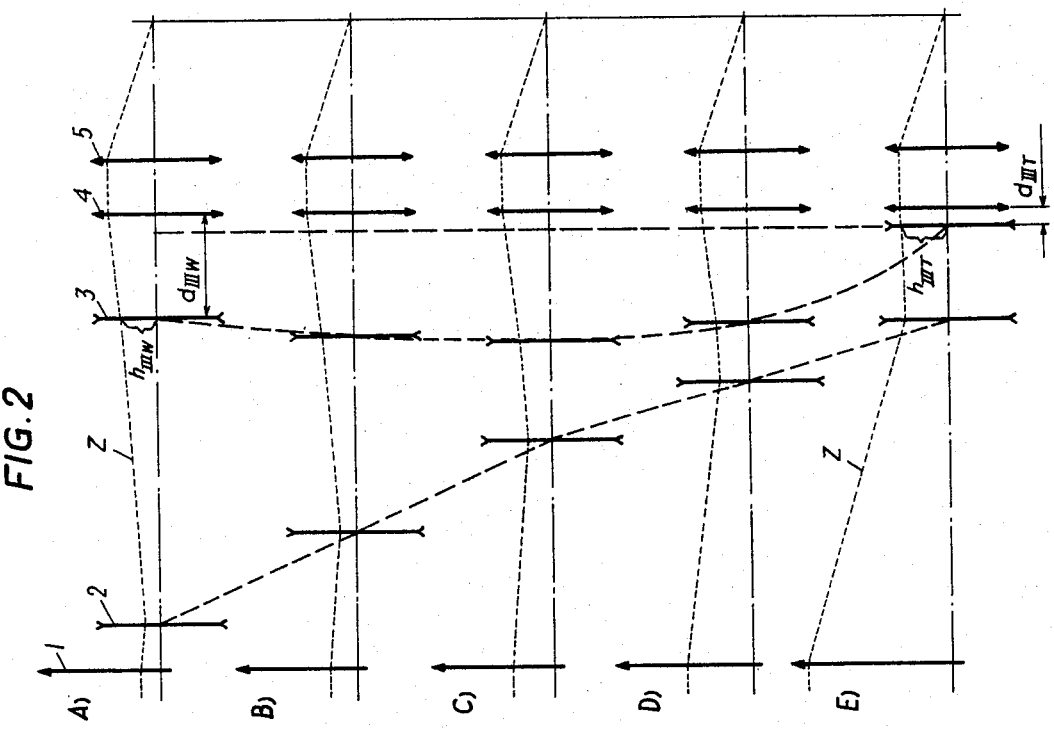
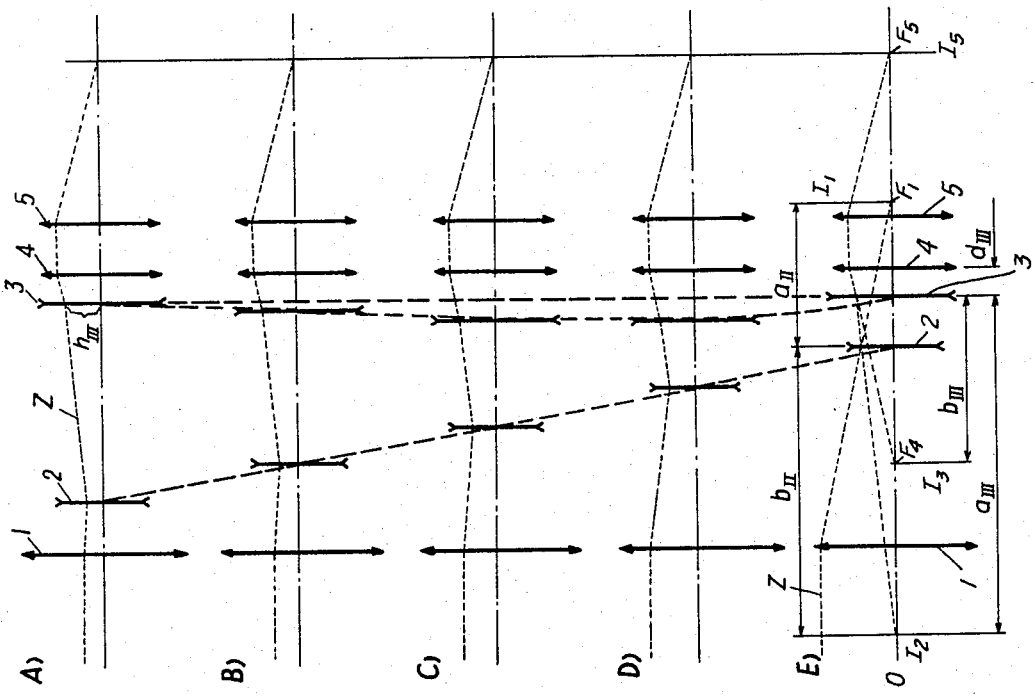

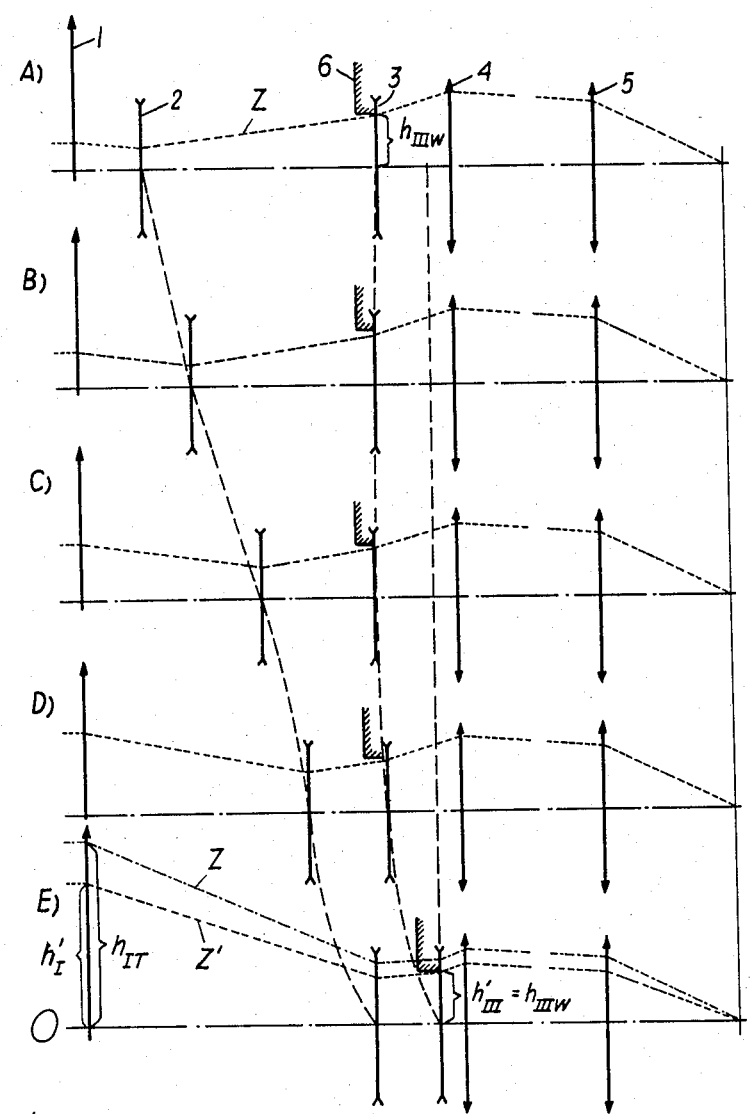
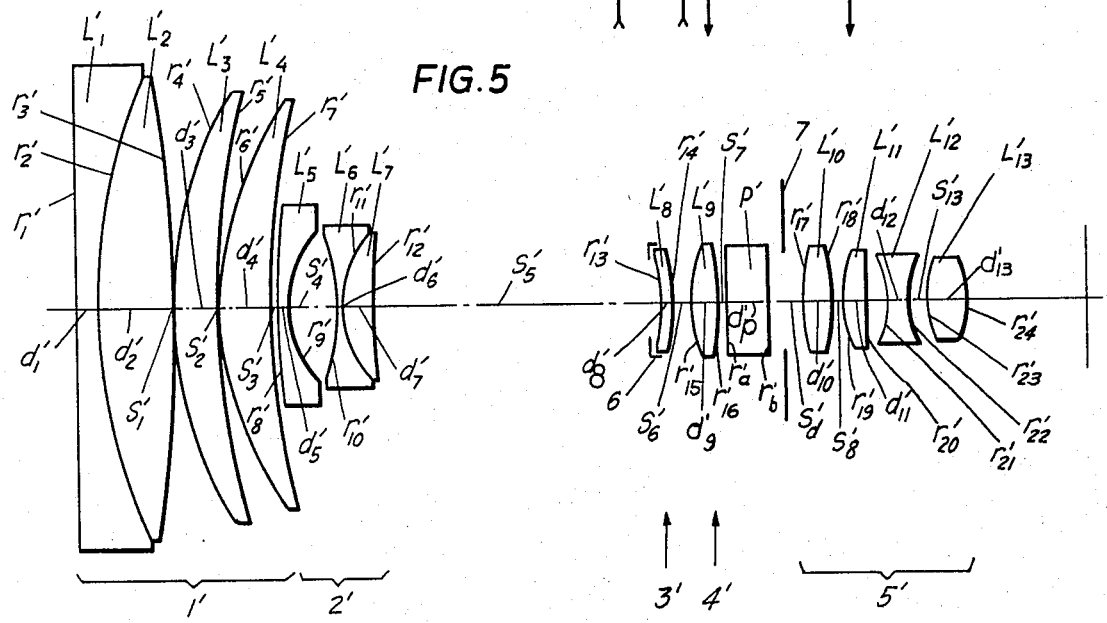
FIG. 3
FIG. 5

4,087,160

CAMERA OBJECTIVE OF VARIABLE FOCAL LENGTH

FIELD OF THE INVENTION

Our present invention relates to a camera objective of the pancratic type, having a variable focal length, in which a four-component varifocal forward lens group is coaxially juxtaposed with a fixed-focus rear lens group.

BACKGROUND OF THE INVENTION

In such objectives it is customary to assemble the varifocal front group from two axially shiftable components of negative refractivity bracketed by two positively refracting components whose axial position is substantially fixed (allowance being made for a limited axial adjustability, for focusing purposes, of especially the first component or at least a front lens forming part thereof). A typical varifocal or pancratic objective of this description has been disclosed in U.S. Pat. No. 3,433,559 and in our copending application Ser. No. 713,224 filed Aug. 10, 1976.

There are certain relationships in such a system between their optical qualities, such as relative aperture and varifocal ratio, and their structural parameters including front-lens diameter and total axial length. These relationships are well understood in the art; reference may be made, by way of example, to Austrian Pat. No. 317,576.

It is generally convenient to design the varifocal front group as an afocal system in order to allow interposition of ancillary elements, such as a shutter, a diaphragm and a reflex prism, in a field of parallel rays between the two groups. Since the fourth component of the front group is positively refracting, the combination of the three preceding components must be of dispersive character so that axially incident rays diverge from the axis between the third and fourth components. The extent of this divergence increases, of course, in proportion to the axial separation of the two components; an axial ray bundle fully illuminating the stationary fourth component passes, therefore, through a smaller portion of the third component when the latter is in a forward position than when it lies close to the fourth component.

Systems are known (e.g. from Austrian Pat. Nos. 317,576 and 316,891) in which the axial movement of the third component, designed to keep constant the image plane of the objective during changes of the overall focal length, follows a substantially symmetrical course as the second component is shifted rearwardly from a wide-angle position of minimum focal length $f_{min}$ to a telephoto position of maximum focal length $f_{max}$. In such a case, the third component moves forwardly during a changeover from $f_{min}$ to an intermediate focal length $f_{med}$ and then recedes at about the same rate during a changeover from $f_{med}$ to $f_{max}$, being substantially equidistant from the fourth component in the two limiting positions of the varifocal range.

Alternatively, e.g. as known from French Pat. No. 1,459,076 and German published Specification No. 2,164,937, the motion of the third component may be an unsymmetrical function of the displacement of the second component, so chosen that the third component approaches the fourth component more closely in the telephoto position ($f_{max}$) than in the wide-angle position ($f_{min}$).

OBJECT OF THE INVENTION

The object of our present invention is to provide a more compact varifocal objective of the type specified in which the lens diameters, especially that of the front lens, can be significantly reduced with only a minor loss of illumination in certain positions of adjustment.

SUMMARY OF THE INVENTION

In accordance with our present invention, the first three components of a varifocal forward lens group as defined above have lens diameters sufficient for full illumination of the fourth component by axially incident light rays in the wide-angle position, in which the third and fourth components are relatively widely separated, with such dimensioning of the third component as to make its effective area sufficient for full illumination of the fourth component by axially incident light rays in the wide-angle position, yet with restriction of that bundle of light rays in the telephoto position to less than full illumination of the fourth component.

Thus, taking advantage of the aforedescribed unsymmetrical law of displacement in which the third and fourth components are far apart with the overall focal length $f = f_{min}$ but are closely spaced with $f = f_{max}$, we provide a maximum aperture ratio in the wide-angle position and a slightly reduced aperture ratio in the telephoto position in which a small loss of luminosity at the center of the image (e.g. on the order of one diaphragm stop) can be readily tolerated. This minor restriction of the relative aperture of the objective at the telephoto end of the varifocal range allows a considerable reduction in the diameter of the front lens which can thus be manufactured much more inexpensively and accommodated in a camera housing of correspondingly decreased dimensions. The lowering of the aperture ratio at large overall focal lengths has the incidental advantage of an increased depth of field in the telephoto position.

According to another feature of our invention, the effective area of the third component is circumscribed by an ancillary diaphragm carried thereon, preferably at the forward face of a constituent lens of that component. The ancillary diaphragm may be part of the lens mount for that component.

BRIEF DESCRIPTION OF THE DRAWING

The above and other features of our invention will now be described in detail with reference to the accompanying drawing in which:

FIG. 1 is a schematic view of a conventional pancratic objective with a symmetrical law of displacement for the third component, shown in five different positions;

FIG. 2 is a view similar to FIG. 1 but showing, again in five different positions, a pancratic objective with an asymmetrical law of displacement to which our invention is applicable;

FIG. 3 shows the objective of FIG. 2 provided with an ancillary diaphragm reducing its entrance pupil in the telephoto position;

FIG. 5 is a view similar to FIG. 4A, showing another objective according to our invention in its wide-angle position.

SPECIFIC DESCRIPTION

Figure 4A:
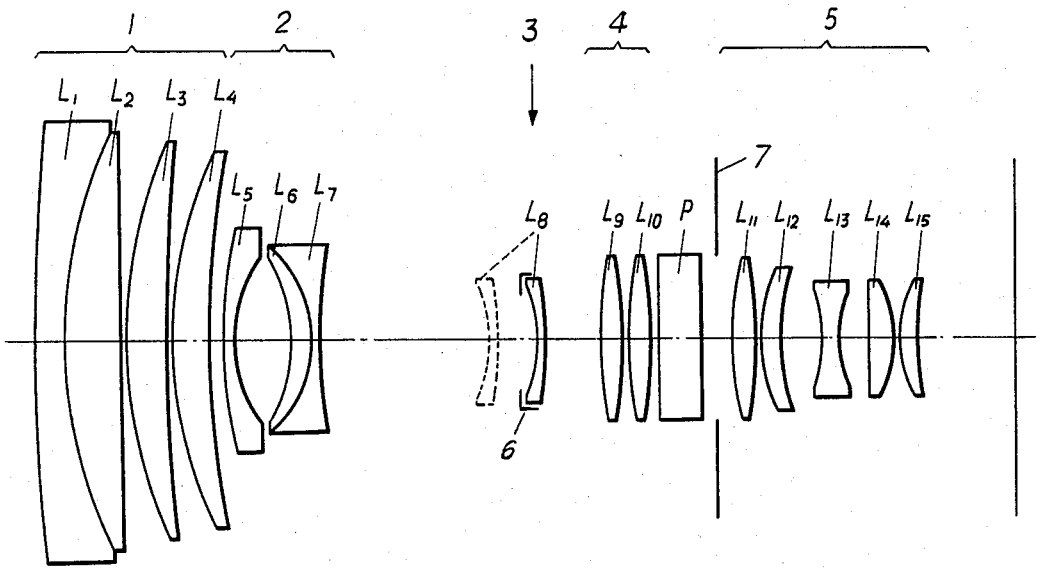
FIGS. 4A, 4B, and 4C are more detailed presentations of an objective of the type shown in FIGS. 2 and 3, illustrated in its wide-angle, intermediate and telephoto positions, respectively.

The conventional pancratic or zoom objective shown in FIG. 1, which may be designed for a camera of the Super-8 type, has a varifocal front attachment consisting of a substantially stationary positive front component 1, two axially shiftable negative components 2 and 3, and a fixed positive component 4; this attachment is coaxially juxaposed with a fixed-focus rear lens group or basic lens system 5. At Z we have shown a limiting ray of an axially incident light bundle focused on a point $F_5$ which is a focal point of component 5 inasmuch the group 1 – 4 is considered to be afocal. Point $F_5$ lies on an image plane $I_5$ whose position is unaffected by the correlated axial displacement of components 2 and 3. Components 1 – 5 have all been represented as thin lenses.

In graph A of FIG. 1, which illustrates the wide-angle position of minimum focal length, component 2 is at extreme left while component 3 is closely spaced from component 4. With component 2 moving progressively toward the right into the telephoto position illustrated in graph E, component 3 is shifted first to the left (graphs B and C), then begins to move back to the right (graph D) and ends up at its original small spacing from component 4 (graph E).

As further shown in graph E of FIG. 1, the limiting ray Z is refracted by component 1 toward its focal point $F_1$ located in an image plane $I_1$ of that component, is intercepted by component 2 so as to seem to originate at an image plane $I_2$, is further refracted by component $I_3$ which increases its divergence from the optical axis to make its apparent origin in an image plane $I_3$ coincide with the focal point $F_4$ of component 4, and then passes parallel to the axis to component 5 (the image plane of component 4 being thus at infinity).

The object distance of component 2, between that component and image plane $I_1$, has been designated $a_{II}$; the corresponding image distance between that component and plane $I_2$ is designated $b_{II}$. In an analogous manner we have designated by $a_{III}$ the object distance of component 3 (measured from plane $I_2$) and by $b_{III}$ the image distance of component 3 (extending to plane $I_2$). With the generally symmetrical law of displacement of component 3 the system satisfies the relationships $$a_{IIW} = -b_{IIT}$$

and $$b_{IIW} = -a_{IIT}$$

where the subscripts W and T indicate the wide-angle position of FIG. 1 (A) and the telephoto position of FIG. 1 (E), respectively. In the middle position of FIG. 1 (C), we have $$a_{IIM} = -b_{IIM}.$$

The magnification ratio $\beta_{II}$ of the second component 2 in the wide-angle position is the reciprocal of that in the telephoto position, i.e.

$$\beta_{IIW} = 1/\beta_{IIT}.$$

In the middle position of FIG. 1 (C), with $f = f_{med}$, we find $$\beta_{IIM} = -1.$$

For the third component 3 we have $$a_{IIIW} = a_{IIIT},$$

$$b_{IIIW} = b_{IIIT},$$

$$\beta_{IIIW} = \beta_{IIIT}.$$

If the position of the limiting ray Z is determined by the diameter of component 4, then the effective area of component 3 varies inversely with its distance $d_{III}$ from component 4. The radius of this effective area has been indicated at $h_{III}$ in FIG. 1(A) and is the same in the wide-angle and telephoto positions. The relative aperture $B_{III}$ of component 3 can thus be expressed by $$B_{III} = f_{III}/2h_{III}$$

where $f_{III}$ is the individual focal length of this component. It follows that, in the system of FIG. 1, $$B_{IIIW} = B_{IIIT}.$$

In the system of FIG. 2 the separation $d_{IIIW}$ between components 3 and 4 in the wide-angle position, graph A, substantially exceeds the corresponding spacing $d_{IIIT}$ in the telephoto position of graph E. With zooming from the position of FIG. 2 (A) to that of FIG. 2 (E), component 3 moves forward into the position of FIG. 2 (B) and reaches its most advanced point in the intermediate position of FIG. 2 (C). In that position we again have the relationships $$a_{IIM} = -b_{IIM}$$

and $$\beta_{IIM} = -1.$$

With further increases in the overall focal length, component 3 recedes into the position of FIG. 2 (D) before reaching its final position closest to component 4 according to FIG. 2 (B).

Instead of the equations relating to the system parameters of FIG. 1, we now have the following inequalities:

$$a_{IIW} < -b_{IIT},$$

$$-b_{IIW} > a_{IIT},$$

$$d_{IIIW} < d_{IIIT},$$

$$B_{IIIW} < B_{IIIT}.$$

The final inequality results from the fact that, owing to the close spacing of components 3 and 4 in the telephoto position, radius $h_{IIIT}$ is significantly larger than the corresponding radius $h_{IIIW}$ in the wide-angle position.

In accordance with our present invention, and as shown in FIG. 3, the effective radius $h_{III}$ is limited in the telephoto position (graph E) to the value $h_{IIIW}$ which it assumes in the wide-angle position (graph A). This limitation is here brought about by the provision of an ancillary diaphragm 6 fastened to the front face of component 3, the presence of this diaphragm being without effect upon the width of the axially incident light bundle in the positions of graphs B and C in which the spacing of component 3 from component 4 exceeds that of graph A. In FIG. 3(D) the axial separation of these components is slightly less than in graph A so that diaphragm 6 begins to restrict the effective diameter of component 3, thereby reducing the entrance pupil of the objective. In FIG. 3(E) this restriction results in a limiting ray Z' traversing the front component 1 at a point whose distance $h'_I$ from the axis is substantially less than the corresponding distance $h_{II}$ of ray Z. Thus, the diameter of component 1 can be materially reduced without significantly restricting the brightness of the image except in positions at or close to the telephoto end of the varifocal range.

The ancillary diaphragm 6 may be part of the lens mounting of component 3. Even if that diaphragm were omitted, the reduction of the diameter of the front component would have an equivalent effect on the axially incident ray bundle.

Figure 6A:
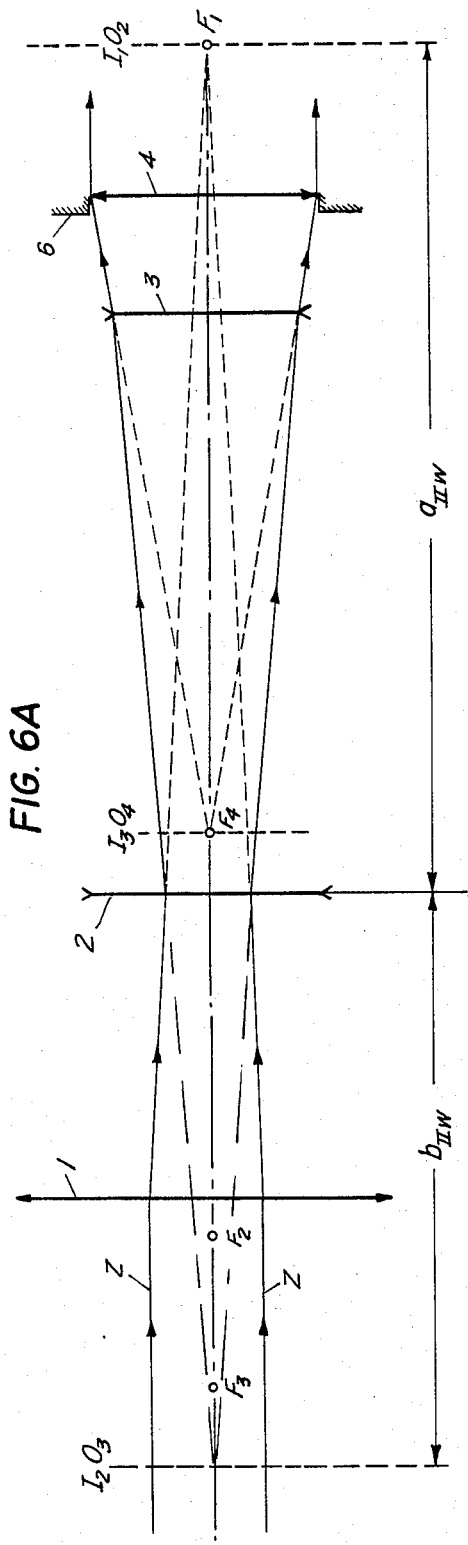
FIGS. 6A and 6B are more detailed diagrammatic views of the objective of FIG. 3 in its wide-angle and telephoto positions, respectively.
Figure 6B:
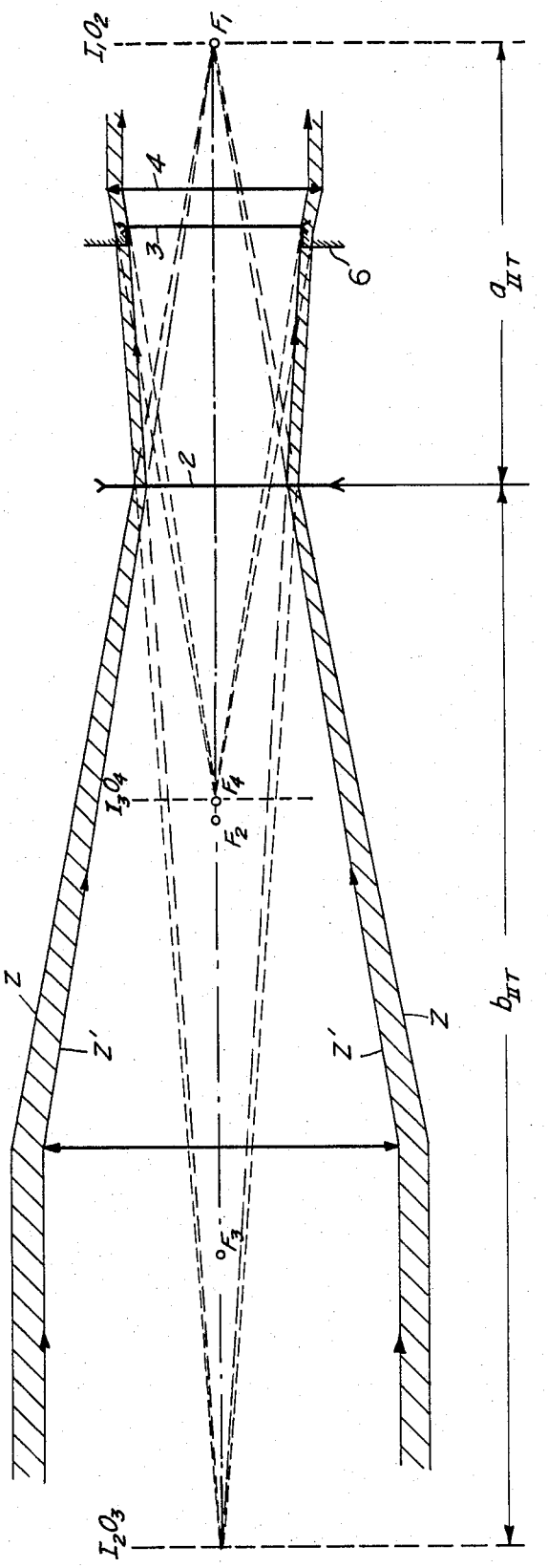

The relationships briefly discussed above will be better understood from a reference to FIGS. 6A and 6B in which the focal points of positive component 1, negative components 2, 3 and positive component 4 have been indicated at $F_1$, $F_2$, $F_3$ and $F_4$. An axially incident bundle of parallel light rays, with limiting rays Z, impinges upon component 1 and converges toward its focal point $F_1$ whose image plane $I_1$ also constitutes the object plane $O_2$ of component 2. The light bundle intercepted by the latter component appears to originate at an image plane $I_2$ which is also the object plane $O_3$ of component 3. The relative positions of components 2 and 3 are so chosen that the image plane $I_3$ of component 3, also constituting the object plane $O_4$ of component 4, always passes through the focal point $F_4$ whereby the light bundle is focused on infinity after leaving the lens group 1 – 4.

In view of the afocality of this lens group, focal point $F_4$ constitutes the vertex of a light cone whose base has a diameter equal to that of component 4. As component 3 approaches component 4, its own effective diameter must increase if it is to pass all the rays of this light cone that can be collected by component 4 in the wide-angle position of FIG. 6A. The incident cylindrical light bundle corresponding to this cone fills only a limited central zone of front component 1. In the telephoto position of FIG. 6B, however, component 1 must have a large diameter in order to allow full illumination of component 4. By making the effective diameter of component 3 in the telephoto position equal to that in the wide-angle position, we can substantially reduce the diameter of component 1 with only a minor diminution of the total quantity of incident light as indicated by the hatched areas in FIG. 6B.

Figure 4B:
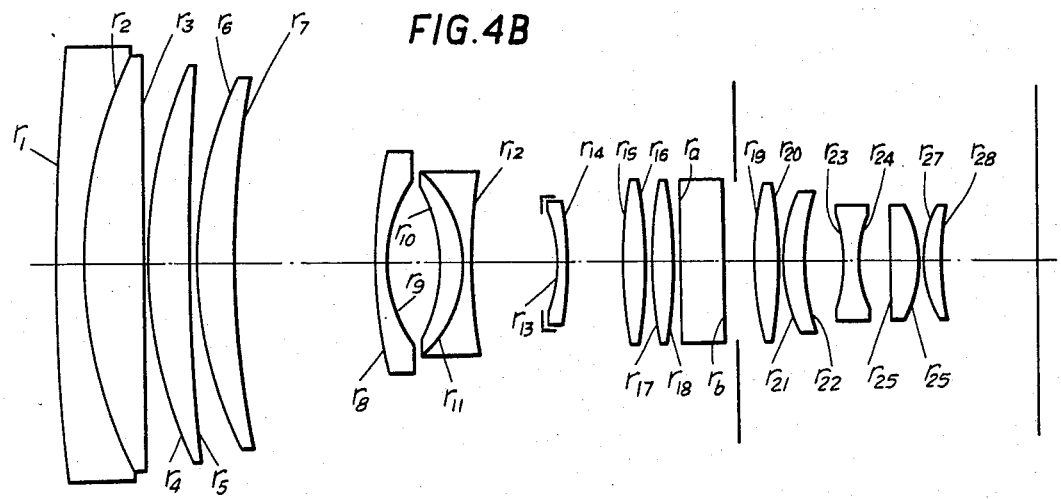
Figure 4C:
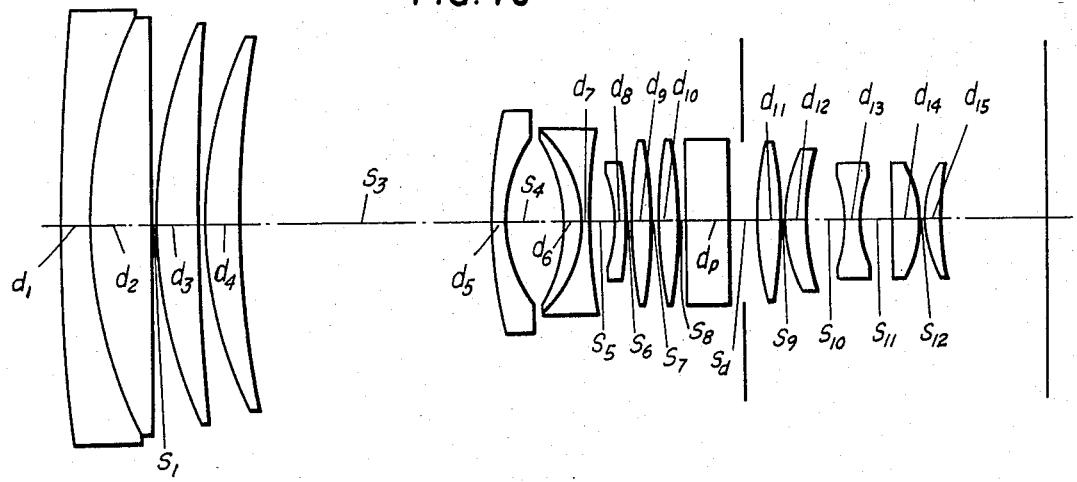

In FIGS. 4A, 4B and 4C we have shown the wide-angle position, the middle position and the telephoto position of a representative objective conforming to the one indicated diagrammatically in FIGS. 1, 2 and 3. Component 1 comprises a front lens member in the form of a doublet consisting of a negative meniscus $L_1$ with radii $r_1$, $r_2$ and thickness $d_1$ cemented onto a nearly planoconvex lens $L_2$ with radii $r_2$, $r_3$ and thickness $d_2$. Component 1 further includes two positive lenses $L_3$ (radii $r_4$, $r_5$ and thickness $d_3$) and $L_4$ (radii $r_6$, $r_7$ and thickness $d_4$) with intervening air spaces $s_1$ and $s_2$. A variable air space $s_3$ separates lens $L_4$ from the axially shiftable component 2 consisting of a singlet $L_5$ in the form of a negative meniscus (radii $r_8$, $r_9$ and thickness $d_5$) separated by an air space $s_4$ from a doublet consisting of lenses $L_6$ (radii $r_{10}$, $r_{11}$ and thickness $d_6$) and $L_7$ (radii $r_{11}$, $r_{12}$ and thickness $d_7$). Another variable air space $s_5$ lies between component 2 and component 3 which consists of a single lens $L_8$ in the form of a negative meniscus with radii $r_{13}$, $r_{14}$ and thickness $d_8$. In dotted lines we have illustrated an alternate position of component 3 designed to facilitate, in a manner known per se, the taking of pictures in a so-called macro range with image ratios between 1: −10 and 1: −1. A third variable air space $s_6$ lies between component 3 and axially fixed component 4 which in this instance consists of two air-spaced biconvex lenses $L_9$ (radii $r_{15}$, $r_{16}$ and thickness $d_9$) and $L_{10}$ (radii $r_{17}$, $r_{18}$ and thickness $d_{10}$), the intervening air space having been designated $s_7$.

A reflex prism P of thickness $d_p$, whose planar faces have been designated $r_a$ and $r_b$, is separated by an air space $s_8$ from lens $L_{10}$ and by a diaphragm space $s_d$ from component 5, the latter space containing an iris diaphragm 7 distinct from the invariable ancillary diaphragm 6 on face $r_{13}$ on lens $L_8$. Component 5 consists of five air-spaced singlets, namely a biconvex lens $L_{11}$ (radii $r_{19}$, $r_{20}$ and thickness $d_{11}$), a positive meniscus $L_{12}$ (radii $r_{21}$, $r_{22}$ and thickness $d_{12}$), a biconcave lens $L_{13}$ (radii $r_{23}$, $r_{24}$ and thickness $d_{13}$), a planoconvex lens $L_{14}$ (radii $r_{25}$, $r_{26}$ and thickness $d_{14}$) and another positive meniscus $L_{15}$ (radii $r_{27}$, $r_{28}$ and thickness $d_{15}$); the intervening air spaces have been designated $s_9$, $s_{10}$, $s_{11}$ and $s_{12}$.

In the following Table A we have given representative numerical values for the parameters $r_1 - r_{28}$, $d_1 - d_{15}$ and $s_1 - s_{12}$ of the optical system of FIGS. 4A – 4C, based upon a mean overall focal length $f_{med} = 1$ in the middle position of FIG. 4B. The Table also gives the refractive indices $n_d$ and the Abbe number $v_d$ of the various lenses.

TABLE A

| Lens | Radii | | Thicknesses and Separations | $n_d$ | $v_d$ | Diameter |
|---|---|---|---|---|---|---|
| $L_1$ | $r_1$ | = + | 21.871 | | | |
| | | | $d_1 = 0.15$ | 1.805 | 25.4 | |
| | $r_2$ | = + | 3.172 | | | |
| $L_2$ | | | $d_2 = 0.46$ | 1.607 | 59.5 | |
| | $r_3$ | = − | 262.556 | | | |
| | | | $s_1 = 0.01$ | | | |
| $L_3$ | $r_4$ | = + | 3.740 | | | |
| | | | $d_3 = 0.32$ | 1.689 | 49.5 | |
| | $r_5$ | = + | 30.344 | | | |
| | | | $s_2 = 0.01$ | | | |
| $L_4$ | $r_6$ | = + | 3.047 | | | |
| | | | $d_4 = 0.29$ | 1.744 | 44.8 | |
| | $r_7$ | = + | 8.896 | | | |
| | | | $s_3 = \begin{cases} 0.061 \ldots f_{min} \\ 0.951 \ldots f_{med} \\ 1.773 \ldots f_{max} \end{cases}$ | | | |
| $L_5$ | $r_8$ | = + | 5.897 | | | |
| | | | $d_5 = 0.08$ | 1.691 | 54.7 | |

TABLE A-continued

| Lens | Radii | | | Thicknesses and Separations | $n_d$ | $\nu_d$ | Diameter |
|---|---|---|---|---|---|---|---|
| | $r_9$ | = + | 1.020 | | | | |
| | | | | $s_4 = 0.39$ | | | |
| $L_6$ | $r_{10}$ | = − | 1.317 | | | | |
| | | | | $d_6 = 0.15$ | 1.847 | 23.8 | |
| | $r_{11}$ | = − | 0.954 | | | | |
| $L_7$ | | | | $d_7 = 0.06$ | 1.569 | 63.1 | |
| | $r_{12}$ | = + | 6.800 | | | | |
| | | | | $s_5 = \begin{cases} 1.540 & ... f_{min} \\ 0.575 & ... f_{med} \\ 0.184 & ... f_{max} \end{cases}$ | | | |
| $L_8$ | $r_{13}$ | = − | 1.018 | | | | |
| | | | | $d_8 = 0.06$ | 1.744 | 44.8 | $D_{8eff} = 0.78$ |
| | $r_{14}$ | = − | 3.854 | | | | |
| | | | | $s_6 = \begin{cases} 0.416 & ... f_{min} \\ 0.490 & ... f_{med} \\ 0.059 & ... f_{max} \end{cases}$ | | | |
| $L_9$ | $r_{15}$ | = + | 5.601 | | | | |
| | | | | $d_9 = 0.17$ | 1.620 | 60.3 | $D_9 eff = 1.11$ |
| | $r_{16}$ | = − | 2.361 | | | | |
| | | | | $s_7 = 0.01$ | | | |
| $L_{10}$ | $r_{17}$ | = + | 3.879 | | | | |
| | | | | $d_{10} = 0.14$ | 1.620 | 60.3 | |
| | $r_{18}$ | = − | 5.870 | | | | |
| | | | | $s_8 = 0.06$ | | | |
| P | $r_a$ | = | ∞ | | | | |
| | | | | $d_p = 0.32$ | 1.517 | 64.2 | |
| | $r_b$ | = | ∞ | | | | |
| | | | | $s_d = 0.21$ | | | |
| $L_{11}$ | $r_{19}$ | = + | 1.752 | | | | |
| | | | | $d_{11} = 0.18$ | 1.620 | 60.3 | |
| | $r_{20}$ | = − | 6.856 | | | | |
| | | | | $s_9 = 0.01$ | | | |
| $L_{12}$ | $r_{21}$ | = + | 1.015 | | | | |
| | | | | $d_{12} = 0.18$ | 1.620 | 60.3 | |
| | $r_{22}$ | = + | 2.066 | | | | |
| | | | | $s_{10} = 0.25$ | | | |
| $L_{13}$ | $r_{23}$ | = − | 1.059 | | | | |
| | | | | $d_{13} = 0.14$ | 1.847 | 23.8 | |
| | $r_{24}$ | = + | 1.059 | | | | |
| | | | | $s_{11} = 0.21$ | | | |
| $L_{14}$ | $r_{25}$ | = | ∞ | | | | |
| | | | | $d_{14} = 0.21$ | 1.713 | 53.8 | |
| | $r_{26}$ | = − | 0.772 | | | | |
| | | | | $s_{12} = 0.01$ | | | |
| $L_{15}$ | $r_{27}$ | = + | 0.953 | | | | |
| | | | | $d_{15} = 0.14$ | 1.620 | 60.3 | |
| | $r_{28}$ | = + | 4.297 | | | | |

This system has a minimum focal length $f_{min} = 0.46$, a maximum focal length $f_{max} = 3.44$, a relative aperture varying between 1 : 1.2 (in the wide-angle position) and 1 : 1.5 (in the telephoto position), and an image diagonal $2y' = 0.47$. As indicated in the Table, the effective diameter $D_{8eff}$ of lens $L_8$ has the numerical value 0.78. Thus, the objective has a varifocal ratio $f_{max} : f_{min}$ of about 8 : 1, with $f_{min} \approx 2y'$. The reduced diameter of front component 1, realized by a decrease of the relative aperture in the telephoto position, amounts to about 85% of the diameter that would be required for full illumination of component 4 in that position.

FIG. 5 shows another embodiment of our invention in the wide-angle position. Its front component 1' comprises a positive doublet consisting of lenses $L'_1$ (radii $r'_1, r'_2$ and thickness $d'_1$) and $L'_2$ (radii $r'_2, r'_3$ and thickness $d'_2$) closely followed by two positive menisci $L'_3$ (radii $r'_4, r'_5$ and thickness $d'_3$) and $L'_4$ (radii $r'_6, r'_7$ and thickness $d'_4$), the intervening air spaces $s'_1$ and $s'_2$ being practically zero. A variable air space $s'_3$ separates component 1' from component 2' which again consists of two lens members, i.e. a singlet $L'_5$ (radii $r'_8, r'_9$ and thickness $d'_5$) and a doublet made up of lenses $L'_6$ (radii $r'_{10}, r'_{11}$ and thickness $d'_6$) and $L'_7$ (radii $r'_{11}, r'_{12}$ and thickness $d'_7$). After another variable air space $s'_5$ there follows the third component 3', again consisting of a single negative meniscus $L'_8$ (radii $r'_{15}, r'_{16}$ and thickness $d'_8$), separated by a third variable air space $s'_6$ from the fourth component 4' which in this instance is a single biconvex lens $L'_9$ (radii $r'_{15}, r'_{16}$ and thickness $d'_9$). A reflex prism P', of thickness $d'_p$ and with planar faces $r'_a, r'_b$, is separated from lens $L'_9$ by an air space $s'_7$ and from the rear component 5' by a diaphragm space $s'_d$.

Component 5' consists here of four singlets, namely a positive lens $L'_{10}$ (radii $r'_{17}, r'_{18}$ and thickness $d'_{10}$), a positive lens $L'_{11}$ (radii $r'_{19}, r'_{20}$ and thickness $d'_{11}$), a negative lens $L'_{12}$ (radii $r'_{21}, r'_{22}$ and thickness $d'_{12}$) and a positive lens $L'_{13}$ (radii $r'_{23}, r'_{24}$ and thickness $d'_{13}$); the intervening air spaces have been designated $s'_8, s'_9$ and $s'_{10}$.

Representative numerical values for parameters $r'_1 - r'_{24}, d'_1 - d'_{13}$ and $s'_1 - s'_{10}$, again based on a mean focal length $f_{med} = 1$, are given together with refractive indices $n_d$ and Abbe numbers $\nu_d$ in the following Table B.

TABLE B

| Lens | Radii | | | Thicknesses and Separations | $n_d$ | $\nu_d$ | Diameter |
|---|---|---|---|---|---|---|---|
| $L'_1$ | $r'_1$ | = + | 123.127 | | | | |
| | | | | $d'_1 = 0.11$ | 1.805 | 25.4 | |
| $L'_2$ | $r'_2$ | = + | 2.801 | | | | |
| | | | | $d'_2 = 0.43$ | 1.620 | 60.3 | |
| | $r'_3$ | = − | 5.218 | | | | |
| | | | | $s'_1 = 0$ | | | |

TABLE B-continued

| Lens | Radii | | | Thicknesses and Separations | $n_d$ | $v_d$ | Diameter |
|---|---|---|---|---|---|---|---|
| $L'_3$ | $r'_4$ | = + | 2.308 | $d'_3 = 0.17$ | 1.622 | 53.2 | |
|  | $r'_5$ | = + | 4.175 | $s'_2 = 0$ | | | |
| $L'_4$ | $r'_6$ | = + | 1.643 | $d'_4 = 0.24$ | 1.643 | 48.0 | |
|  | $r'_7$ | = + | 3.972 | $s'_3 = \begin{cases} 0.031 \ldots f_{min} \\ 0.994 \ldots f_{med} \\ 1.373 \ldots f_{max} \end{cases}$ | | | |
| $L'_5$ | $r'_8$ | = + | 4.332 | $d'_5 = 0.04$ | 1.691 | 54.7 | |
|  | $r'_9$ | = + | 0.473 | $s'_4 = 0.23$ | | | |
| $L'_6$ | $r'_{10}$ | = − | 1.128 | $d'_6 = 0.04$ | 1.620 | 60.3 | |
| $L'_7$ | $r'_{11}$ | = + | 0.626 | $d'_7 = 0.15$ | 1.805 | 25.4 | |
|  | $r'_{12}$ | = + | 3.189 | $s'_5 = \begin{cases} 1.402 \ldots f_{min} \\ 0.258 \ldots f_{med} \\ 0.155 \ldots f_{max} \end{cases}$ | | | |
| $L'_8$ | $r'_{13}$ | = − | 0.990 | $d'_8 = 0.01$ | 1.788 | 47.4 | $D'_{8\mathit{eff}} = 0.47$ |
|  | $r'_{14}$ | = − | 3.946 | $s'_6 = \begin{cases} 0.122 \ldots f_{min} \\ 0.303 \ldots f_{med} \\ 0.028 \ldots f_{max} \end{cases}$ | | | |
| $L'_9$ | $r'_{15}$ | = + | 0.982 | $d'_9 = 0.10$ | 1.682 | 48.2 | $D'_{9\mathit{eff}} = 0.57$ |
|  | $r'_{16}$ | = − | 3.593 | $s'_7 = 0.04$ | | | |
| P' | $r'_a$ | = | ∞ | $d'_p = 0.22$ | 1.517 | 64.2 | |
|  | $r'_b$ | = | ∞ | $s'_d = 0.17$ | | | |
| $L'_{10}$ | $r'_{17}$ | = + | 1.885 | $d'_{10} = 0.09$ | 1.744 | 44.8 | |
|  | $r'_{18}$ | = − | 2.897 | $s'_8 = 0.02$ | | | |
| $L'_{11}$ | $r'_{19}$ | = + | 0.653 | $d'_{11} = 0.11$ | 1.744 | 44.8 | |
|  | $r'_{20}$ | = | ∞ | $s'_9 = 0.03$ | | | |
| $L'_{12}$ | $r'_{21}$ | = − | 0.869 | $d'_{12} = 0.31$ | 1.847 | 23.8 | |
|  | $r'_{22}$ | = + | 0.506 | $s'_{10} \cdot 0.05$ | | | |
| $L'_{13}$ | $r'_{23}$ | = + | 1.404 | $d'_{13} = 0.21$ | 1.735 | 41.6 | |
|  | $r'_{24}$ | = − | 0.533 | | | | |

This system has a minimum focal length $f_{min} = 0.27$ and a maximum focal length $f_{max} = 2.78$. Its relative aperture ranges from 1 : 1.8 (in the wide-angle position) to 1 : 2 (in the telephoto position); its image diagonal is $2y' = 0.31$. The effective diameter of lens $L'_8$, given in the Table, is $D'_{8\mathit{eff}} = 0.47$. The minimum focal length $f_{min}$ falls here short of the image diagonal $2y'$ by more than 10%. The objective of Table B is not as fast as that of Table A but has a higher varifocal ratio, slightly exceeding 10 : 1.

In practice, the reduction of the diameter of the front component 1 cannot be carried quite as far as diagrammatically illustrated in FIG. 6B because of the adverse effect this would have on nonaxially incident light bundles. Hence, component 3 and diaphragm 6 are chosen to determine the relative aperture of the system throughout its varifocal range.

We claim:

1. In a camera objective of variable focal length including a varifocal forward lens group and a fixed-focus rear lens group centered on a common optical axis, said forward lens group consisting of a substantially axially fixed positive first component, an axially shiftable negative second component, an axially shiftable negative third component and an axially fixed fourth component, said second and third components being displaceable between a wide-angle position of minimum overall focal length and a telephoto position of maximum overall focal length with maintenance of an invariant image plane behind said rear lens group, said third component approaching said fourth component more closely in said telephoto position than in said wide-angle position, the combination of said first, second and third components being of dispersive character, the improvement wherein said first, second and third components have lens diameters sufficient for full illumination of said fourth component by axially incident light rays in said wide-angle position but wherein said third component has an effective area sufficient for full illumination of said fourth component by a bundle of axially incident light rays in said wide-angle position but restricting said bundle to less than full illumination of said fourth component in said telephoto position.

2. The improvement defined in claim 1 wherein said third component is provided with diaphragm means circumscribing said effective area.

3. The improvement defined in claim 2 wherein said diaphragm means is carried on a front face of a constituent lens of said third component.

4. The improvement defined in claim 2 wherein said diaphragm means forms part of a lens mount for said third component.

5. The improvement defined in claim 1 wherein said first component consists of four lenses $L_1$, $L_2$, $L_3$ and $L_4$, said second component consists of lenses $L_5$, $L_6$ and $L_7$, said third component consists of a lens $L_8$ and said fourth component consists of lenses $L_9$ and $L_{10}$, said lenses having radii of curvature $r_1 - r_{18}$, axial thicknesses $d_1 - d_{10}$ and axial spacings $s_1 - s_7$ whose numerical values, based upon a numerical value of unity for an intermediate overall focal length, together with their refractive indices $n_d$ and Abbe numbers $v_d$ are substantially as given in the following table:

| | | $n_d$ | $v_d$ |
|---|---|---|---|
| $r_1 = + 21.9$ | | | |
| | $d_1 = 0.15$ | 1.81 | 25 |
| $r_2 = + 3.2$ | | | |
| | $d_2 = 0.46$ | 1.61 | 60 |
| $r_3 = - 262.6$ | | | |
| | $s_1 = 0.01$ | | |
| $r_4 = + 3.7$ | | | |
| | $d_3 = 0.32$ | 1.69 | 50 |
| $r_5 = + 30.3$ | | | |
| | $s_2 = 0.01$ | | |
| $r_6 = + 3.0$ | | | |
| | $d_4 = 0.29$ | 1.74 | 45 |
| $r_7 = + 8.9$ | | | |
| | $s_3 = \begin{cases} 0.06 \dots f_{min} \\ 0.95 \dots f_{med} \\ 1.77 \dots f_{max} \end{cases}$ | | |
| $r_8 = + 5.9$ | | | |
| | $d_5 = 0.08$ | 1.69 | 55 |
| $r_9 = + 1.0$ | | | |
| | $s_4 = 0.39$ | | |
| $r_{10} = - 1.3$ | | | |
| | $d_6 = 0.15$ | 1.85 | 24 |
| $r_{11} = - 1.0$ | | | |
| | $d_7 = 0.06$ | 1.57 | 63 |
| $r_{12} = + 6.8$ | | | |
| | $s_5 = \begin{cases} 1.54 \dots f_{min} \\ 0.58 \dots f_{med} \\ 0.18 \dots f_{max} \end{cases}$ | | |
| $r_{13} = - 1.0$ | | | |
| | $d_8 = 0.06$ | 1.74 | 45 |
| $r_{14} = - 3.9$ | | | |
| | $s_6 = \begin{cases} 0.42 \dots f_{min} \\ 0.49 \dots f_{md} \\ 0.06 \dots f_{max} \end{cases}$ | | |
| $r_{15} = + 5.6$ | | | |
| | $d_9 = 0.17$ | 1.62 | 60 |
| $r_{16} = - 2.4$ | | | |
| | $s_7 = 0.01$ | | |
| $r_{17} = + 3.9$ | | | |
| | $d_{10} = 0.14$ | 1.62 | 60 |
| $r_{18} = - 5.9$ | | | |

6. The improvement defined in claim 5 wherein the effective diameter of lens $L_8$ has a numerical value of substantially 0.78.

7. The improvement defined in claim 1 wherein said first component consists of four lenses $L'_1$, $L'_2$, $L'_3$ and $L'_4$, said second component consists of lenses $L'_5$, $L'_6$ and $L'_7$, said third component consists of a lens $L'_8$ and said fourth component consists of a lens $L'_9$, said lenses having radii of curvature $r'_1 - r'_{16}$, axial thicknesses $d'_1 - d'_9$ and axial spacings $s'_1 - s'_6$ whose numerical values, based upon a numerical value of unity for an intermediate overall focal length, together with their refractive indices $n_d$ and Abbe numbers $v_d$ are substantially as given in the following table:

| | | $n_d$ | $v_d$ |
|---|---|---|---|
| $r'_1 = + 123.1$ | | | |
| | $d'_1 = 0.11$ | 1.81 | 25 |
| $r'_2 = + 2.8$ | | | |
| | $d'_2 = 0.43$ | 1.62 | 60 |
| $r'_3 = - 5.2$ | | | |
| | $s'_1 = 0$ | | |
| $r'_4 = + 2.3$ | | | |
| | $d'_3 = 0.17$ | 1.62 | 53 |
| $r'_5 = + 4.2$ | | | |
| | $s'_2 = 0$ | | |
| $r'_6 = + 1.6$ | | | |
| | $d'_4 = 0.24$ | 1.64 | 48 |
| $r'_7 = + 4.0$ | | | |
| | $s'_3 = \begin{cases} 0.03 \dots f_{min} \\ 0.99 \dots f_{med} \\ 1.37 \dots f_{max} \end{cases}$ | | |
| $r'_8 = + 4.3$ | | | |
| | $d'_5 = 0.04$ | 1.69 | 55 |
| $r'_9 = + 0.5$ | | | |
| | $s'_4 = 0.23$ | | |
| $r'_{10} = - 1.1$ | | | |
| | $d'_6 = 0.04$ | 1.62 | 60 |
| $r'_{11} = + 0.6$ | | | |
| | $d'_7 = 0.15$ | 1.81 | 25 |
| $r'_{12} = + 3.2$ | | | |
| | $s'_5 = \begin{cases} 1.40 \dots f_{min} \\ 0.26 \dots f_{med} \\ 0.16 \dots f_{max} \end{cases}$ | | |
| $r'_{13} = - 1.0$ | | | |
| | $d'_8 = 0.01$ | 1.79 | 47 |
| $r'_{14} = - 4.0$ | | | |
| | $s'_6 = \begin{cases} 0.12 \dots f_{min} \\ 0.30 \dots f_{med} \\ 0.03 \dots f_{max} \end{cases}$ | | |
| $r'_{15} = + 1.0$ | | | |
| | $d'_9 = 0.10$ | 1.68 | 48 |
| $r'_{16} = - 3.6$ | | | |

8. The improvement defined in claim 7 wherein the effective diameter of lens $L'_8$ has a numerical value of substantially 0.47.

* * * * *